United States Patent
Burg et al.

(10) Patent No.: US 7,742,536 B2
(45) Date of Patent: Jun. 22, 2010

(54) METHOD FOR CALCULATING FUNCTIONS OF THE CHANNEL MATRICES IN LINEAR MIMO-OFDM DATA TRANSMISSION

(75) Inventors: Andreas Burg, Maur (CH); Helmut Bölcskei, Zürich (CH); Moritz Borgmann, Zürich (CH); Davide Cescato, Zurich (CH); Jan Hansen, Renningen (DE)

(73) Assignee: Eth Zurich Eth Transfer, Zurich (CH)

( * ) Notice: Subject to any disclaimer, the term of this patent is extended or adjusted under 35 U.S.C. 154(b) by 475 days.

(21) Appl. No.: 11/667,281

(22) PCT Filed: Nov. 7, 2005

(86) PCT No.: PCT/CH2005/000651
§ 371 (c)(1),
(2), (4) Date: Nov. 16, 2007

(87) PCT Pub. No.: WO2006/050627
PCT Pub. Date: May 18, 2006

(65) Prior Publication Data
US 2008/0317141 A1 Dec. 25, 2008

Related U.S. Application Data

(60) Provisional application No. 60/626,731, filed on Nov. 9, 2004.

(51) Int. Cl.
*H04K 1/10* (2006.01)
(52) U.S. Cl. ..................... 375/260; 370/206
(58) Field of Classification Search ............... 375/260; 370/203, 208–211, 343
See application file for complete search history.

(56) References Cited

U.S. PATENT DOCUMENTS 7,382,718 B2 * 6/2008 Chang et al. ............... 370/204

OTHER PUBLICATIONS

"Interpolation-Based Efficient Matrix Inversion for MIMO-OFDM Receivers", Mortiz Borgmann and Helmut Bolcskei, Communication Technology Laboratory, Swiss Federal Institute of Technology ETH Zentrum, Sternwartstrasse 7, 8092 Zurich, Switzerland, pp. 1941-1947.

XP000377685, "Data parallel evaluation-interpolation algorithm for polynomial matrix inversion", E.V. Krishnamurthy and Chen Pin, Parallel Computing vol. 19, (1993) pp. 577-589.

XP-002364815, "IEEE Transactions on Automatic Control", vol. 37, No. 3, Mar. 1992, pp. 363-365.

"Numerical and Symbolic Computation of Polynomial Matrix Determinant", Martin Hromcik and Michael Sebek, Institute of Information Theory and Automation, 182 08 Praque, Czech Republic and Trnka Laboratory for Automatic Control Czech Technical University, Praque, Czech Republic, 1999 IEEE, pp. 1887-1888.

(Continued)

*Primary Examiner*—Kevin Y Kim
(74) *Attorney, Agent, or Firm*—Cooper & Dunham LLP (57) ABSTRACT

The present application describes a method for transmitting data through a MIMO-OFDM system which requires the computation of a function $f(H(s_k))$, where H is the channel matrix and $s_k = \exp(j \cdot 2 \cdot pi \cdot k/N)$. The method splits function f into a first, nonpolynomial part, which is in turn a function of one or more polynomial functions in $s_k$.

16 Claims, 2 Drawing Sheets

OTHER PUBLICATIONS

XP-002364816, "Polynomial Evaluation and Interpolation on Special Sets of Points", Alin Bostan and Eric Schost, Jan. 31, 2004, pp. 1-30.

XP-002364817, "Reliable Numerical Methods for Polynomial Matrix Triangularization" IEEE Transactions on Automatic Control, Didier Henrion, and Michael Sebek, vol. 44, No. 3, Mar. 1999, pp. 497-508.

XP-008059026, "Algebraic Manipulation of Polynomial Matrices: A Survey", Stephen Barnett, Department of Mathematics, University of Essex, Wivenhoe Park, Colchester Co4 3SQ,UK, IMA Journal of Mathematical Control & Information (1990) vol. 7, pp. 249-256.

"FFT Calculation of a Determental Polynomial", Luisa E. Paccagnella and Gianfranco L. Pierrobon, pp. 401-402.

* cited by examiner

METHOD FOR CALCULATING FUNCTIONS OF THE CHANNEL MATRICES IN LINEAR MIMO-OFDM DATA TRANSMISSION

CROSS REFERENCE TO RELATED APPLICATIONS

This application claims the priority of U.S. provisional patent application 60/626,731, filed Nov. 9, 2004, the disclosure of which is incorporated herein by reference in its entirety.

TECHNICAL FIELD

The invention relates to a method for transmitting data through a MIMO-OFDM system, and in particular to a method for calculating functions of the channel matrices in linear MIMO-OFDM data transmission.

BACKGROUND ART

The demand for ever-increasing data rates in communication systems dictates the use of large bandwidths. Orthogonal frequency-division multiplexing (OFDM) (see refs. [1], [2]) has become a widely accepted technique to significantly reduce receiver complexity in broadband wireless systems. Multiple standards employing OFDM modulation for the physical layer have emerged by now, among them the 802.11a/g wireless local area network (WLAN) standard (see ref. [3]), the 802.16 broadband wireless access (BWA) standard (see ref. [4]), and the European digital audio broadcasting (DAB) and digital video broadcasting standards (DVB-T). OFDM is also widely used in wireline systems, such as covered by the various xDSL standards. In wireless applications, OFDM is often combined with bit loading and/or precoding at the transmitter, and usually referred to as discrete multi-tone (DMT) modulation.

For wireless systems, multiple-input multiple-output (MIMO) systems employ multiple antennas at both the transmitting and receiving side of the radio link to improve spectral efficiency. Other MIMO systems can, e.g., transmit data in parallel through a number of cables with crosstalk between the same. MIMO techniques in conjunction with OFDM modulation (MIMO-OFDM) are popular for modern broadband communication systems and can be used to transmit at high data rates (see ref. [5]). MIMO-OFDM is, among others, under consideration in the 802.11n high throughput working group, which aims to extend the data rates of 802.11a/g based WLANs beyond the current maximum of 54 Mbit/s. As a wireline example for MIMO-OFDM systems, high-rate xDSL links are often impaired by crosstalk between wires running in parallel and can thus also be modeled as MIMO-OFDM systems. MIMO-OFDM transceivers are computationally very complex. For the implementation of practicable systems, it is, therefore, crucial to devise efficient algorithms for MIMO-OFDM.

Figure 4:
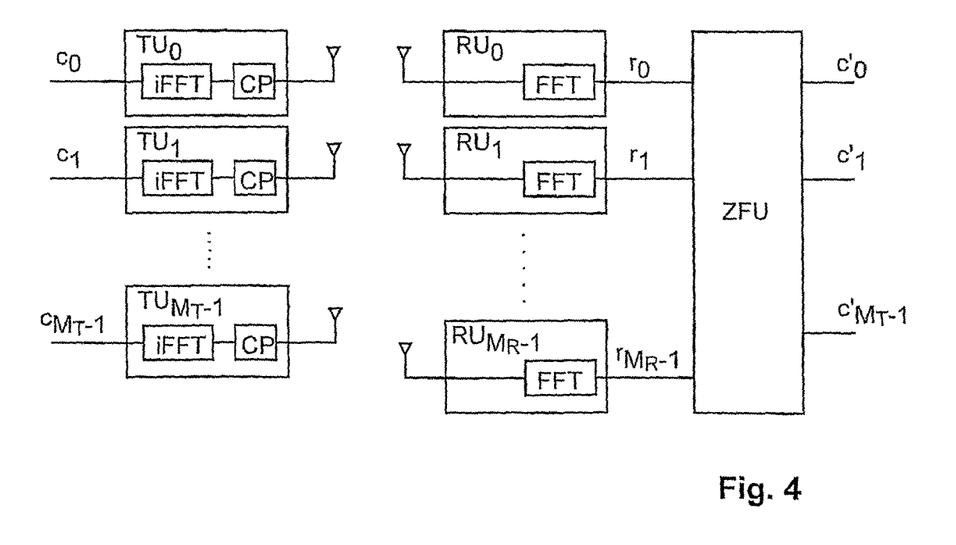

Systems of this type, as shown in FIG. 4, generally have a transmitter and a receiver. The transmitter comprises $M_T$ transmitter units $TU_0 \ldots TU_{M_T-1}$ and the receiver comprises $M_R$ receiver units $RU_0 \ldots RU_{M_R-1}$.

A sequence of original data symbols is fed to the transmitter, each original data symbol comprising N>1 vectors $c_k$ with k=0 ... N−1, wherein each vector $c_k$ has $M_T$ complex-valued coordinates $(c_0)_k \ldots (c_{M_T-1})_k$ to be fed to the transmitter units $TU_0 \ldots TU_{di\,T-1}$.

The original data symbols are OFDM-modulated in the transmitter units, the result of which is transmitted over a dispersive channel to the receiver units, which demodulate the channel output into received symbols. Each received symbol comprises N vectors $r_k$ with k=0 ... N−1, wherein each vector $r_k$ has $M_R$ complex-valued coordinates $(r_0)_k \ldots (r_{M_R-1})_k$. For a linear channel (or an approximately linear channel) we have, $$r_k = \sqrt{E_x} \cdot H(s_k) c_k + w_k, \qquad (i)$$

with
$\sqrt{E_s}$ being a constant, namely the square root of an energy scaling factor $E_s$,
$s_k = \exp(-j2\pi k/N)$, j being the imaginary unit, $$H(s_k) = \sum_{l=0}^{L-1} H_l s_k^l, \qquad (ii)$$

L an integer smaller than N,
$H_l$ being an $M_R \times M_T$ matrix having coefficients $(H_{ij})_l$ describing the value at discrete-time delay l of the discrete-time impulse response of the channel between transmitter unit $TU_j$ and receiver unit $RU_i$, and
$w_k$ being the noise vector of the system, which is assumed to be a complex valued circularly symmetric white Gaussian zero-mean noise.

DISCLOSURE OF THE INVENTION

It is a general object of the invention to provide a more efficient method for inverting the matrices $H(s_k)$, or carrying out other operations on these matrices.

This object is achieved by the method of claim 1.

Accordingly, the method provides a way to calculate a function $f(H(s_k))$ for some k∈0, 1, ..., N−1 if this function can be expressed in the following form $$f(H(s_k)) = f_{NP}(f_P^0(H(s_k)), \ldots f_P^{J-1}(H(s_k))), \qquad (iii)$$

with J≥1 and scalar-, vector- or matrix-valued polynomial functions $f_P^0(H(s_k)), \ldots f_P^{J-1}(H(s_k))$. In other words, the function f(.) can be decomposed into a potentially nonpolynomial function $f_{NP}$, which has one or more input values. The input value(s) of $f_{NP}$ are, in their turn, functions $f_P^i(s_k)$ with i=0 ... M−1. The functions $f_P^i(s_k)$ are polynomial in $s_k$, i.e., they can be expressed as $$f_P^i(H(s_k)) = \sum_{l=0}^{N-1} A_l^i s_k^l \text{ with coefficients } A_l^i. \qquad (iv)$$

The functions $f_P^i(s_k)$, and therefore the coefficients $A_l^i$ can be scalar-, vector-, or matrix-valued. However, the functions $f_P^i(s_k)$ do not depend on all powers $s_k^l$ of $s_k$, but rather on a true subset thereof. In other words, only a number of $Q_i$ coefficients $A_l^i$ are nonzero, with $1 \leq Q_i < N$, while the remaining number of $N-Q_i$ coefficients are zero. Those coefficients that are nonzero are arbitrary functions $A_l^i = g_l^i(H_0, \ldots H_{L-1})$ of the matrix-valued channel impulse response taps $H_0, \ldots H_{L-1}$.

Hence, function $f_P^i(s_k)$ is fully known if its value is known at $Q_i$ arbitrary different values of $s_k$. This can be exploited for calculating any value of $f_P^i(s_k)$ not by explicitly expanding the polynomial of the equation (iv) above, but by interpolating the polynomial using its values at at least $Q_i$ different points.

In other words, the evaluation of the polynomial functions involves two steps:

Step A) determining from known $H(s_k)$, for at least some of the polynomial functions $f_P^i(H(s_k))$, a number of $V_i \geq Q_i$ values of said function $f_P^i(H(s_k))$ at values $s_k$ with $k \in \Omega_i$, wherein the magnitude of the set $\Omega_i$ is $|\Omega_i| \geq Q_i$. This calculation can be carried out directly, i.e., not by first determining the $H_l$, by plugging the known values $H(s_k)$ into the functions $f_P^i(k(s_k))$.

Step B) determining, for at least some of said polynomial functions $f_P^i(H(s_k))$, at least one value $f_P^i(H(s_k))$ for an $s_k$ with $k \notin \Omega_i$ by interpolation of the values of said function $f_P^i(H(s_k))$ obtained in step A).

The interpolation of a polynomial in step B is generally computationally inexpensive. If the computation of the function $f_P^i(s_k)$ is computationally complex, it may be more computationally efficient to obtain $f_P^i(H(s_k))$ for an $s_k$ with $k \notin \Omega_i$ by interpolation instead of direct evaluation of the function $f_P^i(s_k)$. The potential for computational savings is particularly large if $Q_i$ is substantially smaller than the number of points $s_k$ at which the function f(.) is to be evaluated.

As described in more detail below, the present method is applicable to a whole set of problems in MIMO-OFDM communications. Typical examples are the calculation of the (regularized) channel inverses or a QR decomposition of the channel matrices.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

1. Introduction and Outline

In MIMO systems, two basic signaling modes can be employed, namely space-time coding (see ref. [6]) or space-frequency coding (see ref. [7]), which leverages the spatial degrees of freedom (at the cost of rate) to improve link reliability, and spatial multiplexing (see refs. [8], [9]), which aims at increasing the data rate by spatially multiplexing independent data streams. For simplicity, we only consider spatial multiplexing. On each antenna, the transmitter sends a symbol chosen from a finite constellation. There are numerous decoding strategies for the receiver. Exhaustive search maximum-likelihood (ML) decoding results in optimum performance, but suffers from an extremely high complexity, which is exponential in the constellation rate and number of antennas. Sphere decoding techniques can sometimes lower the effort required for ML decoding. Successive cancellation methods (see ref [10]) decode one stream after another and subtract it out from the received symbols, similarly to decision-feedback equalization. This class of methods often delivers acceptable performance and complexity. Conceptually the simplest decoding method is linear decoding, in which the receiver multiplies the received vector with an inverse of the channel matrix to obtain an estimate for the sent data.

Note that although, for simplicity, we describe linear receivers in the context of spatial multiplexing, linear front-ends can also be used for space-frequency coding scenarios, in which case our techniques are equally well applicable.

Again for simplicity, our description focuses on the complexity of zero-forcing (ZF) class of linear receivers (see ref. [11]) in the context of MIMO-OFDM. When operating in wideband multipath channels, channel matrices are different (albeit correlated) across all OFDM subcarriers. When the OFDM system employs a large number of tones, a large number of matrices need to be inverted for linear receivers, a task that can quickly become unmanageable.

As we lay out in Section 5, our technique can be applied to many more channel preprocessing problems in MIMO-OFDM, not only to channel inversion. Channel inversion is described here in detail as a prominent example of an application of our technique.

In Section 2, we describe fundamentals of zero-forcing receivers for MIMO-OFDM and introduce our system setup. Section 2-C reviews some concepts in numerical linear algebra and then presents our efficient channel inversion algorithm. In Section 4, we investigate the relevance of the new algorithms to real-world systems. The extension of the technique to a wide set of problems in MIMO-OFDM communications is presented in Section 5.

2. Zero-Forcing Receivers for Spatial Multiplexing MIMO-OFDM

In this section, we first introduce the signal and channel model and review the principles of linear receivers for MIMO-OFDM.

A MIMO-OFDM system with zero-forcing receiver is shown in FIG. 4 and has already been briefly described above.

As can be seen, each transmitter unit $TU_i$ comprises a block iFFT calculating the inverse Fourier transform of the complex component $c_i$ of the vectors $c_k$ with k=0 . . . N−1, i.e. the inverse Fourier transform of the sequence of complex numbers $(c_i)_0 \ldots (c_i)_{N-1}$. Furthermore, a block CP is provided for adding a cyclic prefix to the inverse Fourier transform as known to the person skilled in the art.

The signals are then fed to $M_T$ sender antennas, received by $M_R$ receiver antennas, and forwarded to the receiver units $RU_i$ (i=0 . . . $M_R$−1). Each receiver unit calculates the Fourier transform of the incoming values to calculate the complex component $r_i$ of the vectors $r_k$ (k=0 . . . N−1). The vectors $r_k$ are fed to a zero forcing unit (ZFU), which calculates estimates $c'_k$ of the vectors $c_k$.

A. Discrete-Time Channel and Signal Model

In the following, $M_T$ and $M_R$ denote the number of transmit and receive antennas, respectively. We assume that the channel consists of L matrix-valued taps $H_l$ of dimension $M_T \times M_R$, l=0, 1, ..., L−1, with the matrix-valued transfer function given by $$H(e^{j2\pi\theta}) = \sum_{l=0}^{L-1} H_l e^{-j2\pi l\theta}, \quad 0 \leq \theta < 1. \quad (1)$$

Note that in general there is a continuum of delays. The channel model eq. (1) is derived from the assumption of having L resolvable paths, where $L = \lfloor B\tau \rfloor + 1$ with B and $\tau$ denoting the signal bandwidth in Hz and delay spread in seconds, respectively.

In an OFDM-based MIMO system, the individual transmit signals corresponding to the $M_T$ transmit antennas are OFDM-modulated before transmission. In the following, N denotes the number of OFDM tones. In practice, a certain number of tones at the band edge (virtual subcarriers) are not used, i.e., set to zero, in order to ease frontend filtering requirements. Also, often pilot symbols are interspersed with the data. We assume that $P \leq N$ tones carry useful data, and denote the set of indices corresponding to the data tones by $\Pi \subseteq \{0, 1, \ldots, N-1\}$. On each of the transmit antennas and each of the used tones, independent data symbols $c_{k,m}$, $k \in \Pi$, m=0, 1, ..., $M_T$−1, chosen from an arbitrary complex constellation, are sent. For each transmit antenna, the OFDM modulator applies an N-point inverse fast Fourier transform (IFFT) to N consecutive symbols (consisting of P data symbols as well as N−P pilot symbols and virtual subcarriers) and then prepends the cyclic prefix (CP) of length $L_{CP} \geq L$ to the parallel-to-serial-converted OFDM symbol. The receiver first discards the CP and then applies an N-point fast Fourier transform (FFT) to each of the MR received signals. Organizing the transmitted data symbols into vectors $c_k = [c_{k,0}\ c_{k,1} \ldots c_{k,M_T-1}]^T$, $k \in P$, the relevant received signal vectors are given by equation (i) above.

B. Zero-Forcing-Receiver

Knowing the channel matrices, the zero-forcing unit ZFU basically computes the unconstrained least squares estimate of the sent data vector for each tone:

$$c'_k = H^\dagger(e^{j2\pi k/N}) r_k, \quad k \in \Pi$$

where $H^\dagger(e^{j2\pi k/N})$ denotes the pseudoinverse of the channel matrix $H(e^{j2\pi k/N})$.

C. Channel Inversion

It is obvious that the computation of P channel inverses (each of dimension $M_T \times M_R$) puts a huge computational burden on the receiver. However, the channel imposes additional structure: There are only $L \cdot M_R \cdot M_T$ degrees of freedom instead of $P \cdot M_R \cdot M_T$ ones (in practical systems, L<<P). In other words, the channel's transfer function is highly oversampled, or the response of adjacent tones is potentially highly correlated. In the following, we demonstrate how the structure of the channel can be exploited to significantly reduce the computation required for inverting the channel matrices.

In the following, for simplicity of exposition, we consider "square" systems with an equal number of transmit and receive antennas, $M_T = M_R = M$. In this case, assuming that the $H(e^{j2\pi k/N})$ are invertible, taking the pseudoinverse is equivalent to computing the ordinary inverse:

$$c'_k = H^{-1}(e^{j2\pi k/N}) r_k, \quad k \in \Pi.$$

In Section 5, we present the extension to the case of non-square channel matrices.

D. Complexity of MIMO-OFDM Receivers

In the following, we extensively discuss the complexity of the operations required for performing the channel inversion, and the resulting algorithmic tradeoffs. An important question is what a relevant complexity metric is. This metric is, in practice, highly dependent on the chosen platform for implementation, e.g., a general purpose processor, a digital signal processor (DSP), or a very large scale integration (VLSI) implementation of a full-custom application specific integrated circuit (ASIC). However, the computational requirements for high-rate MIMO-OFDM receivers are so high that in most cases, only dedicated VLSI implementations are able to perform the processing with adequate power, throughput, and area efficiency.

Therefore, we focus on the assessment of complexity in a VLSI implementation. In VLSI signal processing, the operations governing the overall complexity are full complex multiplications (with two variable operands) and, much less so, multiplications with constant coefficients (used, e.g., in filters). We use, therefore, only the count of these two types of operations for obtaining a complexity metric. A more detailed assessment of complexity can also be performed if other operations apart from multiplications such as additions are taken into account. But since multiplications dominate the effective complexity, we only consider the multiplication count here.

Another important issue to consider is that the size of practically relevant channel matrices is rather low. As a rough guideline, in most MIMO scenarios it is not be sensible from a communication-theoretic as well as economic perspective to employ more than about six antennas at each side of the link. Therefore, it is not at all meaningful to consider only asymptotic results on the complexity of matrix computations. A more in-depth analysis is necessary.

3. Efficient Channel Inversion for MIMO-OFDM

We show now how the structure of the channel matrices $H(e^{j2\pi k/N})$ can actually be exploited for efficient computation of their inverses, and analyze the performance tradeoffs involved in the algorithms. If we set $$s_k \triangleq e^{-j2\pi \frac{k}{N}}$$

we can express the transfer function as a polynomial of degree L−1 in $s_k$:

$$H(s_k) = \sum_{l=0}^{L-1} H_l s_k^l.$$

The goal is now to efficiently compute the P channel inverses $H^{-1}(s_k)$, $k \in \Pi$. Before we describe our algorithm, we review some fundamentals of numerical linear algebra.

A. Preliminaries in Numerical Linear Algebra

1) Laplace Expansion of the Determinant: The determinant of a square M×M matrix A is recursively defined by $$\det A = \sum_{j=1}^{M} (-1)^{i+j} a_{ij} \det A_{ij} \qquad (3)$$

for an arbitrary i (without loss of generality, we have expanded the determinant along a row). The matrix $A_{ij}$ is the (M−1)×(M−1) submatrix obtained by deleting row i and column j of A. $\det A_{ij}$ is a minor, $(-1)^{i+j} \det A_{ij}$ is a cofactor of A. In the following, we call minors and cofactors obtained from m×m submatrices m-minor and m-cofactor, respectively.

It takes $c_{det} = M(2^{M-1}-1)$ multiplications to compute the determinant of an M×M matrix using eq. (3). For large matrices, it can be more effective to triangularize the matrix (e.g., using the LU decomposition), and to compute the determinant from the diagonal entries of the triangular matrix. The asymptotic complexity of this approach is approximately $O(M^3)$, instead of the exponential complexity of Laplace expansion. However, a crucial advantage of Laplace expansion for VLSI implementation is that the method is division-free, as opposed to many triangularization techniques.

2) The Adjoint and the Inverse: The transposed matrix of cofactors of a matrix A, defined by $$[adj(A)]_{ji} = (-1)^{i+j} \det A_{ij}$$

is the adjoint of A.

To the best of our knowledge, it is not possible to give a simple closed-form expression for the number of multiplications $c_{adj}(M)$ needed to compute the adjoint of an M×M matrix recursively using Laplace expansion. However, the following bound can be given:

$$M(2^M + M^2 - 3M - 2) < c_{adj}(M) \leq M(2^{M-2}(M+1) + 0.5 M^2 - 2M - 0.5). \qquad (4)$$

The complexity of this technique is thus again exponential in M, so the recursive method becomes prohibitive above a certain matrix size. For large matrices, different means need to be employed.

Note that once the adjoint of the matrix is known, its determinant can be easily computed using only M additional multiplications.

If the matrix A is nonsingular, its inverse can be written as $$A^{-1} = \frac{adj(A)}{\det(A)}. \qquad (5)$$

In practice, the relation eq. (5) is seldomly used for numerical computation of the inverse because for arbitrary matrix sizes it is hard to obtain the adjoint directly. However, eq. (5) turns out to be highly useful in our case of limited matrix sizes.

3) Polynomial Matrices: In the following, we consider the inversion of polynomial matrices, i.e., matrices whose entries are polynomials. An M×M polynomial matrix A(s) in s of degree n−1 can be written as:

$$A(s) = \sum_{l=0}^{n-1} A_l s^l \qquad (6)$$

In the following, when we say that a polynomial matrix has degree n−1, we assume that each entry has full degree n−1 (i.e., $A_{n-1}$ has no zero entries). It can easily be verified that each m-minor of the matrix A(s) is a polynomial of degree m(n−1). As a corollary, the determinant of A(s) has degree M(n−1), and its adjoint has degree (M−1)(n−1). If the determinant of a polynomial matrix is constant, the matrix is called unimodular.

4) Inversion by the Leverrier-Fadeev Algorithm: There is a large and well-studied class of algorithms for computing the inverse of polynomial matrices that are variations of the Leverrier-Fadeev algorithm for joint determinant and adjoint computation of polynomial matrices (see ref. [12] and the references therein). The complexity scales in the square of the polynomial degree n−1 of the original matrix. Also, the algorithms require a large number of matrix multiplications, which are themselves very costly. Moreover, the algorithm can be numerically highly unstable. Leverrier-Fadeev methods are thus not suited for our problem.

5) Inversion by Interpolation: Consider the matrix polynomial eq. (6) of degree n−1. If the values of A(s) evaluated at n distinct base points $s_0, s_1, \ldots, s_{n-1}$ are known, the coefficients $A_l$ (l=0, 1, ..., n−1) are uniquely determined. By interpolation, the value of the polynomial can be computed at any point s directly from the $A(s_0), A(s_1), \ldots, A(s_{n-1})$, without explicitly solving for the $A_j$. In general, there are numerous interpolation techniques, including a direct approach using a Vandermonde matrix, Newton interpolation, and Lagrange interpolation.

Any m-minor (or m-cofactor) of A(s) is a polynomial of degree m(n−1) and can hence also be interpolated from m(n−1)+1 base points.

As can be seen from eq. (5), the inverse of A(s) is in general not polynomial, unless the matrix is unimodular. Therefore, it is impossible to directly interpolate the inverse. However, the numerator—the adjoint—consists of (M−1)-cofactors, and the denominator—the determinant—can be interpreted as the M-minor. Therefore, both numerator and denominator can be interpolated (see ref. [13]). After interpolation, $M^2$ divisions by the determinant need to be performed in order to obtain the inverse (however, since the denominator is constant for all matrix elements, effectively only a single division and $M^2$ multiplications need to be performed).

B. Interpolation in the MIMO-OFDM Context

With these preliminaries, we show now how interpolation techniques can be used to efficiently invert the channel matrices eq. (2) in MIMO-OFDM systems.

1) Interpolation on the FFT Grid: The interpolation of polynomials can be numerically challenging. However, in our system, the base points (i.e., the channel estimates) lie on the FFT grid, easing the problem of minor interpolation (see ref. [14]).

An m-minor of the channel matrices given by eq. (2) can be interpolated departing from $$L_m \triangleq m(L-1)+1$$

base points. Let us now consider the case of interpolating an m-minor of $H(s_k)$ from $L_m$ base tones (recalling that the 1-minors are the entries of the matrix itself, and the M-minor is the determinant), specified by the index set $\Lambda \subset \{0, 1, \ldots,$ N−1}, to Q>$L_m$ target points (or tones), specified by the index set $\Sigma \subseteq \{0, 1, \ldots, N-1\}$. We collect the values of the minor at the base points into the $L_m$-dimensional vector x, and the values at the target tones into the Q-dimensional vector y. Denote by F, with $[F]_{m,n} = (1/\sqrt{N})e^{-j2\pi nm/N}$, the N×N FFT matrix, and by G the $L_m \times L_m$ matrix obtained by picking the rows indexed by L and the first $L_m$ columns from F. Denote by E the Q×$L_m$ matrix obtained by picking the rows indexed by $\Sigma$ and the first $L_m$ columns from F. Then the interpolation step can be written as $$y = EG^{-1}x.$$

Due to the nature of the FFT matrix, the problem is numerically well-conditioned. The multiplication with $EG^{-1}$ can be interpreted as a time-varying filter operating on the vector x. In practical implementations, the interpolation is not implemented by direct matrix multiplication, but by some approximate (polyphase) interpolation filter structure. The interpolation filters can be designed according to various criteria. If Q>>$L_m$, a multistage approach provides additional savings in complexity. Also, the choice of the basis points has a crucial impact on the structure of the interpolation filters. Various trade-offs between complexity and interpolation accuracy are possible. It is well-known how to achieve the trade-off; see standard texts on multirate signal processing (such as ref. [15]).

2) Complexity of Interpolation Filters: As discussed above, there is a plethora of filter design techniques, resulting in highly efficient interpolation filters. As a rough approximation, the effort required for interpolation is proportional to the number of target tones Q. Although the interpolation filters can be designed to operate efficiently, their complexity impact still needs to be taken into account. As a simple solution, we describe the interpolation steps as requiring an equivalent of $c_{IP}$ full multiplications per target tone, and we express the total cost C of an operation in equivalent full multiplications.

The number of operations required for the interpolation of an M×M channel matrix scales with $M^2$, whereas the number of operations required for the channel inversion or adjoint computation scales at least with $M^3$. It is, therefore, obvious that for most nontrivial MIMO-OFDM applications it is be desirable not to directly invert the full set of P channel matrices, but to employ the interpolation-based algorithm described above. The amount of computational savings is, of course, highly dependent on the equivalent cost of interpolation $c_{IP}$.

C. Channel Inversion Algorithms

We are now ready to describe multiple concrete algorithms for computing the channel inverses and to assess their performance. To allow for a fair comparison of the algorithms, we assume that all algorithms depart from raw tone-by-tone channel estimates. These raw estimates are simply the received symbols during the training preamble period (assuming, without loss of generality, that a training sequence of all-ones has been sent). To obtain channel estimates that take the structure of the channel into account, some sort of "smoothing" (i.e., lowpass-filtering) needs to be performed upfront, which is approximately equivalent to interpolation from a complexity point of view. It needs to be stressed that the two step approach of smoothing and subsequent matrix inversion is ad hoc only. However, optimally estimating the channel inverses directly from the raw channel estimates appears to be hard.

Algorithm I: Brute-Force Inversion Method: The most straightforward way of computing the P channel inverses $H^{-1}(e^{j2\pi k/N})$ is to smooth the channel to obtain P channel matrices, and to invert them subsequently. The overall cost (in terms of multiplications) of this method is $$C_I = Pc_{inv}(M) + PM^2 c_{IP}$$

where $c_{inv}(M)$ denotes the cost of inversion.

Algorithm IIA: Adjoint/Determinant Interpolation Method: As argued above, the full inversion can be very costly since an inversion is performed for each of the P target tones. The basic technique for computing the P channel inverses $H^{-1}(e^{j2\pi k/N})$ more efficiently is as follows: We pick a sufficient set of base indices $\Omega \subseteq \Pi$ and compute the adjoint and determinant of the $H(e^{j2\pi k/N})$, $k \in \Omega$. Then, we interpolate the adjoints and the determinate to obtain their values corresponding to the full set of P data tones. Finally, we divide the adjoints by the determinants and have obtained the P desired channel inverses.

A simple realization of this technique is as follows:
1) Smooth the channel to obtain $L_{M-1}$ base points
2) Compute $L_{M-1}$ adjoints at these base points
3) Interpolate the $L_{M-1}$ adjoints to P target points
4) Smooth an arbitrary row of the channel matrices to $L_M$ base points
5) Compute $L_M$ determinants from the adjoints and the additional channel row.
6) Interpolate the $L_M$ determinants to P target points
7) Evaluate eq. (5) for each of the P tones.

The cost of the algorithm is $$C_{IIA} = ((M-1)(L-1)+1)c_{adj}(M) + M^2(L-1) + M + (P(M^2+1)-1)c_{IP}.$$

Note that the terms due to the adjoint and determinant computation no longer scale in P (only in L and M), thus savings with respect to the first algorithm can be realized. We investigate how large these savings are for practical cases in Section 4. In this algorithm, no means for the computation of the adjoint has been specified. Hence, the algorithm can also be used for even large matrix sizes, where the adjoint is no longer computed using the Laplace expansion. Also note that the choice of the base points in the intermediate steps is in principle arbitrary, but that the choice has a significant impact on the complexity and accuracy of the interpolation filters.

Algorithm IIB: Space-Frequency Interpolation: The previous algorithm can be improved even further by the following observation: It is, in principle, inefficient to compute the adjoint directly at $L_{M-1}$ base points. The minors of lower order in the recursive (Laplace) expansion of adjoint and determinant have a lower polynomial degree. Therefore, it is sufficient to compute these minors at less base points and to subsequently interpolate them up to a larger number of base points. The algorithm can then be described as follows:
1) Smooth the channel to obtain $L_{M-1}$ base points
2) Compute a sufficiently large set of 2-minors at $L_2$ base points
3) Interpolate the $L_2$ minors up to $L_3$ target tones
4) Compute a sufficient set of 3-minors from the interpolated 2-minors and smoothed channel coefficients
5) Repeat the last two steps with minors of increasing size until a set of $M^2$ (M−1)-minors (constituting the adjoints) at $L_{M-1}$ base points is reached
6) Smooth an arbitrary row of the channel matrices to $L_M$ base points
7) Compute $L_M$ determinants from the adjoints and the additional channel row.
8) Interpolate the $L_M$ determinants to P target points
9) Evaluate eq. (5) for each of the P tones.

We coin this algorithm "space-frequency interpolation", because it employs a nested procedure of minor computation and interpolation in the frequency and spatial dimension. Using this approach, the computation spent on adjoints and determinants is reduced to a minimum. The savings are gained at a slight increase in interpolation cost over algorithm IIA, though. It is, in general, not possible to give a simple closed form expression of the cost $C_{IIB}$ of the algorithm, as the number of minors to be computed at each "level" depends in a nontrivial way on the size of the matrix. In the next section, we discuss the cost of the algorithm for practically relevant systems. Also note that a vast number of variants of this algorithm can be devised by omitting certain levels in the algorithm.

4. Practical Systems

Given the number of parameters involved, a judgment about the optimum algorithms can only be made after in-depth complexity considerations for the particular scenario. In this section, we give guidelines for the design decisions in practically relevant cases, and give numerical examples. For these examples, we focus, for simplicity of exposition, only on the system parameters of an 802.16a system (see ref. [4]): The number of used tones (out of 256) is P=200, and the length of the cyclic prefix and hence the maximum number of channel taps L is 8, 16, 32, or 64. Note that our technique applies equally well to any other MIMO-OFDM-based system, too.

A. Computing the Minors

An M×M matrix has $$\binom{M}{m}^2$$

different m-minors. However, when computing the adjoint (or determinant) recursively, not all minors need to be computed at every level. By choosing the row of the submatrices along which the m-minors are expanded in a sensible fashion, potentially only a subset of the (m−1)-minors is needed. For the practically relevant cases of M=2, 3, . . . , 6, the minimum numbers of minors needed, denoted by $R_m$, are listed in the following table:

| | $R_m$ (number of m-minors needed) | | | | | |
|---|---|---|---|---|---|---|
| M | 2 | 3 | 4 | 5 | 6 | $c_{inv}(M)$ |
| 2 | 1 | | | | | 2 |
| 3 | 9 | 1 | | | | 21 |
| 4 | 12 | 16 | 1 | | | 76 |
| 5 | 20 | 30 | 25 | 1 | | 235 |
| 6 | 30 | 60 | 45 | 36 | 1 | 606 |

The table shows the number of m-minors needed in computing the determinant of an M×M matrix by Laplace expansion for m=2, 3, . . . M and the total count of multiplications needed for inversion using Eq. (5).

To compute an m-minor from an (m−1)-minor, m multiplications are needed. Therefore, the cost of direct inversion of an M×M matrix using Laplace expansion is given by $$c_{inv}(M) = \sum_{m=2}^{M} mR_m.$$

The values of $c_{inv}(M)$ for M=2, 3, . . . , 6 are also given in the above table. Algorithm I computes the inverse (and thus spends $c_{inv}(M)$ multiplications) at P points. Algorithm IIA computes the adjoint (equivalent to all possible (M−1)-minors) only at $L_{M-1}$ base points and the determinant at $L_M$ base points, whereas algorithm IIB computes the m-minors only at $L_m$ base points for m=2, 3, . . . , M. Algorithm IIB, therefore, reduces the effort spent on computing the minors to a minimum.

Figure 1:
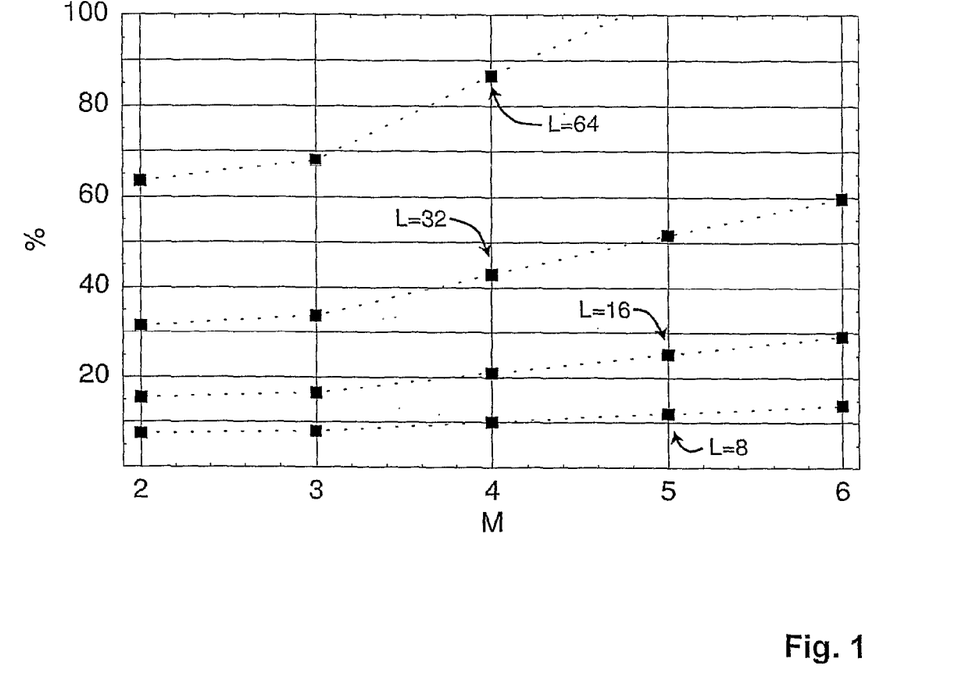
FIG. 1 shows the cost of algorithm IIA (as a percentage of cost of algorithm I) for P=200 tones and varying number of channel taps, interpolation cost not considered.

The number of multiplications spent by algorithm IIB on the adjoint and determinant computation can be expressed in terms of the $$R_m \text{ as } \sum_{m=2}^{M} mR_m L_m,$$

compared to $$\sum_{m=2}^{M} mR_m$$

multiplications spent by algorithm I. FIG. 1 shows the ratio between these numbers for an 802.16a system and hence displays the maximum possible savings to be gained from employing an interpolation-based inversion approach. The cost of interpolation is not taken into account here, so the true savings are always lower. It is clearly visible that except for the L=64 case at large matrix sizes, for all variants of the standard a significant complexity reduction is feasible by using an interpolation-based algorithm. The complexity benefit of algorithm IIA decreases with increasing matrix size. This effect can be attributed to the fact that the polynomial degree of the minors grows with the matrix size, thus more and more base points are needed. The question whether the type II algorithms are useful is directly coupled to the degree of the polynomials in adjoint and determinant, and, therefore, to the number of antennas. The number of adjoints that need to be computed is $L_{M-1}=(M-1)(L-1)+1 \approx ML$. So, very roughly speaking, it can be said that type II algorithms are only sensible if the following rule of thumb is fulfilled:

$$P \gtrsim ML. \quad (7)$$

This condition means that there is little hope of improvement for 802.11a/g based systems (P=48, L=16) for more than two antennas. However, there are many 802.16 scenarios that can greatly benefit of the interpolation based algorithms, as we show in the following.

B. Case Study: The 4×4 Case

In order to illustrate the total cost of channel inversion, including the interpolation cost, it is instructive to consider a fixed matrix size. In the following, we focus on the M=4 case.

Figure 2:
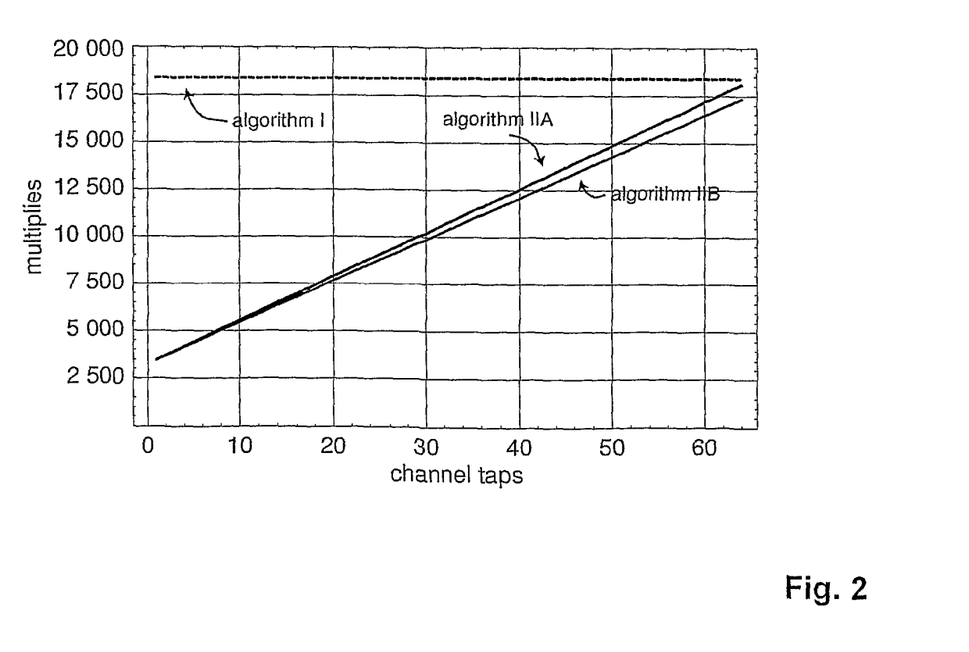
FIG. 2 shows the total cost for a P=200 tones system as a function of the number of channel taps, assuming that $c_{IP}=1$.

In FIG. 2, we plot the total cost, including interpolation, for a 200-tone system as a function of the number of channel taps for the three proposed algorithms. We have set the equivalent cost of interpolation to $c_{IP}=1$. It is clearly visible that the interpolation-based algorithms (IIA/IIB) outperform the full inversion algorithm (I) in the whole range of the plot. However, the slight benefit of IIB over I that was still visible in FIG. 1 at L=64 vanishes almost completely when the interpolation overhead is taken into account.

C. Impact of Interpolation Complexity

Figure 3:
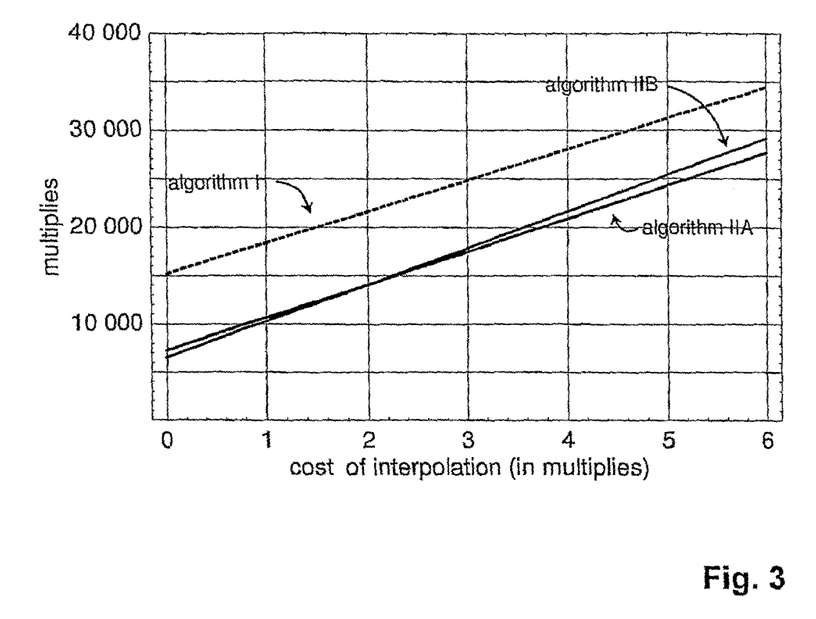
FIG. 3 shows the impact of interpolation complexity on cost of channel inversion for a 4×4 system with P=200 tones and L=32 channel taps, and FIG. 4 an example of a MIMO-OFDM system with zero-forcing receiver.

An interesting observation in FIG. 2 is that the complexity of algorithms IIA and IIB is very similar. However, the relative cost of the two algorithms is highly dependent on the cost of interpolation. So far, we have assumed $c_{IP}=1$. This number is dependent on the system parameters and the chosen implementation. In addition, interpolation accuracy can be traded for complexity, as discussed in Section 4-B.1. In FIG. 3, we plot the computational cost of our 4×4 system based on the 802.16 standard (with L=32) against $c_{IP}$.

It is evident that only at low interpolation costs the more sophisticated algorithm IIB is able to outperform the basic IIA. It can be shown that algorithm IIA always outperforms IIB for $c_{IP}>2$, regardless of N and L. This effect is due to the fact that IIA needs no intermediate interpolation steps, although it performs some superfluous computation (basically, the 2-minors are computed $L_3$ times instead of $L_2$ times). However, once the cost of interpolation exceeds $c_{IP}=2$, the interpolation savings of IIA compensate for this inefficiency. Moreover, for $c_{IP}<2$ the advantage of Algorithm IIB is not significant, so in practical systems it is probably tolerable to implement the simpler algorithm IIA. The savings of algorithm IIB compared to IIA only begin to become significant at more than four antennas. However, from a certain number of antennas on, the expansion-based computation of the adjoint is inefficient, so it is advisable to resort to algorithms with cubic asymptotic complexity for the adjoint and use algorithm IIA for interpolation.

5. Extensions to Other Problems in MIMO-OFDM Communications

The fundamental principle of our algorithm is applicable to a whole set of problems in MIMO-OFDM communications. Many algorithms can be modified to exploit the fact that the channel is highly oversampled, so that the computational complexity is reduced. There is a large number of algorithms that require some form of preprocessing based on the channel. Examples for algorithms requiring preprocessing at the receiver are sphere decoding and vertical Bell Laboratories Space-Time Modulation (V-BLAST). Also, not covered above, ZF receivers for rectangular channels and minimum mean-squared error (MMSE) receivers are to be noted. Our algorithms are not only useful for single user receivers, but also applicable to multiuser receivers. Furthermore, our algorithms are not even confined to applications at the receiver side—when channel state information is available at the transmitter, there is a large variety of precoding methods, which again need to perform some channel preprocessing.

A. General Principle of the Method

The underlying principle for exploiting the highly oversampled nature of the channel is always the same: We factor the problem in such a way that as many operations as possible on the elements of the $H(s_k)$, such that the results of this first step are polynomial in $s_k$, can be performed upfront. Permissible operations include multiplications, additions, and complex conjugates. This way, intermediate results can be computed at a number of base points corresponding to the degree of the corresponding polynomial and then interpolated. The number of required base points can be significantly less than the total number of tones, resulting in large complexity savings. In the end, only the nonmultiplicative operations are performed on the whole set of P tones. In particular, some examples of the use of this principle are the following two algorithms.

In other words, the techniques shown here allow to efficiently calculate a function $f(H(s_k))$ ($k \in \{0, 1, \ldots, N\}$) on the matrices $H(s_k)$ if the function $f$ can be expressed as $$f(H(s_k)) = f_{NP}(f_P^0(H(s_k)), \ldots f_P^{J-1}(H(s_k))) \quad (8)$$

with J>1 and scalar-, vector-, or matrix-valued polynomial functions $f_P^0(H(s_k)), \ldots f_P^{J-1}(H(s_k))$, which are polynomial in $s_k$, wherein function $f_P^i(H(s_k))$ only depends on $Q_i$ different powers of $s_k$ and can be written as $$f_P^i(H(s_k)) = \sum_{l=0}^{N-1} A_l^i s_k^l. \quad (9)$$

A number $Q_i$ of the coefficients $A_l^i$ are arbitrary functions of the matrices $H_0, \ldots H_{L-1}$, i.e.

$$A_l^i = g_l^i(H_0, \ldots H_{L-1}). \quad (10)$$

The remaining $N-Q_i$ coefficients A $A_l^i$ are zero, and we have $1 \leq Q_i < N$. It must be noted that because $s_k$ is a Nth root of unity, the $\{s_k^l, l=0, 1, \ldots, N-1\}$ forms a cyclic group. Thus, all polynomials in $s_k$ can be described by at most N nonzero coefficients. Another difference to polynomials on the set of real (or complex) numbers is that complex conjugations are operations that preserve the polynomial nature of a function, because $(s_k^l)^* = s_k^{-1} = s_k^{N-1}$.

If the function f can be expressed as described above, it can be calculated, starting from known (e.g., measured) $H(s_k)$, in two steps:

Step A) determining from known $H(s_k)$, for at least some of the polynomial functions $f_P^i(H(s_k))$, a number of $V_i \geq Q_i$ values of said function $f_P^i(H(s_k))$ is at values $s_k$ with $k \in \Omega_i$, wherein the cardinality of the set $\Omega_i$ is $|\Omega_i| = V_i \geq Q_i$. This calculation can be carried out directly, i.e., not by first determining the $H_l$, by inserting the known values $H(s_k)$ into the functions $f_P^i(H(s_k))$.

Step B) determining, for at least some of said polynomial functions $f_P^i(H(s_k))$, at least one value $f_P^i(H(s_k))$ for an $s_k$ with $k \notin \Omega_i$ by interpolation of the values of said function $f_P^i(H(s_k))$ obtained in step A).

B. Recursive Application of the Method

It must be noted that this two-step algorithm is only a crude representation of what variations of the procedure may be implemented. A more refined representation takes into account that the elements of the polynomial functions $f_P^i(H(s_k))$ may always be decomposed into a function of a number of subpolynomials, for example a product of subpolynomials. These low-order components may first be computed at a lower number of base points than required for the interpolation of the $f_P^i(H(s_k))$ themselves. In a second step, the components can be interpolated to a number of base points sufficient for the interpolation of higher-degree components derived from components computed in the first step. Then, these higher-order components can be computed from the interpolated values of the lower-order components. This procedure may be repeated recursively, such that the functions $f_P^i(H(s_k))$ are eventually computed by a nested series of "permissible operations" and interpolation steps. "Permissible operations" hereby stand for all operations on components of the $f_P^i(H(s_k))$ that have a result that is polynomial in $s_k$. To visualize the procedure of computing an arbitrary function of the channel matrices $H(s_k)$ by the recursive procedure outlined here, one may think of the computation being organized along a tree, in which every node corresponds to the computation of a function of the $H(s_k)$, and every branch corresponds to an interpolation step. The number of base points at which said functions are computed decrease with the depth of the tree. The topmost function, which is represented by the root node, is $f_{NP}$ ($f_P^0(H(s_k))$, ... $f_P^{J-1}(H(s_k))$), which is computed at as many points $s_k$ as the function f needs to be computed; this function may be arbitrary, i.e., not necessarily polynomial. All other functions represented by the nodes further down in the tree must necessarily be polynomial functions in $s_k$, such that their results can be interpolated to obtain input parameters for the function represented by its parent node. In other words, we can define polynomial functions $f_P^v(H(s_k))$, where v is a vector of indices; each node in the tree is uniquely represented by an index vector v. The level of nodes below the root node (which stands for $f_{NP}(f_P^0(H(s_k)), \ldots f_P^{J-1}(H(s_k)))$) is populated by the polynomial functions $f_P^i(H(s_k))=f_P^v(H(s_k))$ with the index vector v=[i], i=0, 1, ..., J–1, where [i] stands for a vector with the single element i. The recursive method outlined above is performed by computing at least one of the functions $f_P^v(H(s_k))$ with v=[i] using steps comprising a) expressing $f_P^v(H(s_k))$ as $f_P^v(H(s_k))=\tilde{f}_P^v$ ($f_P^{[v,0]}(H(s_k)), \ldots, f_P^{[v,J_v-1]}(H(s_k))$), where the short notation [v, p] is used for the vector obtained by appending p to the end of v and where $\tilde{f}_P^v$ ($f_P^{[v,0]}(H(s_k)), \ldots, f_P^{[v,J_v-1]}(H(s_k))$) is a polynomial function in $s_k$, with $J_v \geq 1$ and scalar-, vector-, or matrix-valued polynomial functions $f_P^{[v,0]}(H(s_k)), \ldots, f_P^{[v,J_v-1]}(H(s_k))$ that can be expressed as $$f_P^{[v,p]}(H(s_k)) = \sum_{l=0}^{N-1} A_l^{[v,p]} s_k^l$$

with coefficients $A_l^{[v,p]}$
wherein a number $Q_{[v,p]}$ of said coefficients are arbitrary functions $A_l^{[v,p]} = g_l^{[v,p]}(H_0, \ldots, H_{L-1})$ of the matrices $H_0, \ldots, H_{L-1}$ and a number $N-Q_{[v,p]}$ said coefficients $A_l^{[v,p]}$ are zero, with $1 \leq Q_{[v,p]} < N$ b) carrying out at least one computation of a said function $f_P^{[v,p]}(H(s_k))$ using either i) the steps comprising step A) determining from known $H(s_k)$, for at least some of said polynomial functions $f_P^{[v,p]}(H(s_k))$, a number of $V_{[v,p]} \geq Q_{[v,p]}$ values of said function $f_P^{[v,p]}(H(s_k))$ at a set of $s_k$ with $k \in \Omega_{[v,p]}$ and $|\Omega_{[v,p]}| = V_{[v,p]} \geq Q_{[v,p]}$, and step B) determining, for at least some of said polynomial functions $f_P^{[v,p]}(H(s_k))$, at least one value $f_P^{[v,p]}(H(s_k))$ for an $s_k$ with $k \notin \Omega_{[v,p]}$ by interpolation of the values of said function $f_P^{[v,p]}(H(s_k))$ obtained in step A).

or ii) recursively applying the method described in steps a) and b) again after assigning said function $f_P^{[v,p]}(H(s_k))$ as $f_P^v(H(s_k)) \leftarrow f_P^{[v,p]}(H(s_k))$ C. Efficient Application of the Method by Sharing of Intermediate Results Also, the above description does not take into account that the different functions $f_P^i(H(s_k))$ may in fact have common contributing terms, whose computation and interpolation can be shared to reduce the total computations needed. In other words, if the computation of said function $f(H(s_k))$ is recursively expanded and if at least two functions $f_P^v(H(s_k))$ and $f_P^{v'}(H(s_k))$ for index vectors $v \neq v'$ are identical, then they can be computed only once such that the results are shared among the computation of the enclosing functions $\tilde{f}_P^u(\ldots)$ and $\tilde{f}_P^{u'}(\ldots)$, where u and u' denote the vectors obtained by deleting the last element from the vectors v and v', respectively.

Depending on the application scenario and the cost of the operations involved, some efficiency gains may be achieved by sensibly applying these refinements described above.

D. Example: Matrix Inversion

Applying the general principle described above to matrix inversion algorithms IIA and IIB above, we have J=2 and $$f(H(s_k))=H^{-1}(s_k)=adj(H(s_k))/det(H(s_k)), \quad (11)$$

$$f_{NP}(f_P^0(H(s_k)), f_P^1(H(s_k))) = \frac{1}{f_P^0(H(s_k))} f_P^1(H(s_k)),$$

wherein $f_P^0(H(s_k))=det(H(s_k))$ is a scalar-valued polynomial in $s_k$ with the coefficients $A_l^0$ depending on the matrices $H_0, \ldots H_{L-1}$. On the other hand, $f_P^1(H(s_k))=adj(H(s_k))$ is a matrix-valued polynomial in $s_k$ with the coefficients $A_l^1$ again depending on the matrices $H_0, \ldots H_{L-1}$. As an example of recursive computation and resource sharing as described above, it can easily be observed that the determinant can always be easily obtained from one row or column of the adjoint and the corresponding row or column of $H(s_k)$ by Laplace expansion (see Algorithm IIA).

It must be stressed that the method imposes no a priori constraints on the method of computing $f_P^0(H(s_k))=det(H(s_k))$ and $f_P^1(H(s_k))=adj(H(s_k))$. Any suitable methods may be employed. For example, well-known standard methods of numerical linear algebra with good scaling behavior may be applied to compute determinant and inverse; the adjoint can obviously be computed as the product of determinant and inverse. Another method, for example, is via Laplace expansion as outlined above. Such a method is straightforward for small-dimensional $H(s_k)$, but limited by its exponential complexity; on the other hand, it allows for a recursive implementation:

The two-step implementation of Eq. (11) is only a crude approximation of the algorithms IIA and IIB. In fact, both algorithms reduce the computations needed by recursive computation of the polynomial components $f_P^0(H(s_k))$ and $f_P^1(H(s_k))$. Algorithm IIB computes the adjoint recursively from minors of $H(s_k)$ as follows: If $minor_m(H(s_k))$ denotes an m-minor of the matrix $H(s_k)$, with the entries of the adjoint of $H(s_k)$ being the set of all possible (M−1)-minors of $n(s_k)$ up to sign flips, and the M-minor of $H(s_k)$ being the determinant of $H(s_k)$, wherein $\text{minor}_m (H(s_k))$ is a scalar-valued polynomial in $s_k$ with $Q_m$ nonzero coefficients $A_i^0$ depending on the matrices $H_0, \ldots H_{L-1}$, and where R is a natural number with $1 < R < M$, then $f_P^1(H(s_k)) = \text{adj}(H(s_k))$ can be computed computed by recursively applying the following steps for R=2, 3, ..., M−1.

a) computing a certain set of R-minors $\{\text{minor}_R (H(s_k))\}$ for $k \in \Omega_R$, where $|\Omega_R| \geq Q_R$, by any suitable method     b) determining the values of said R-minors for at least one $k \in \Omega_R$ by interpolation of the values of said R-minors obtained in step a)

c) computing the values of a set of (R+1)-minors for $k \in \Omega_{R+1}$ using Laplace expansion from the set of R-minors obtained in step b) and suitable elements of the matrices $H(s_k)$ Along this tree-like expansion of the adjoint, the computation of certain minors can be shared according to the general principle as outlined above.

E. Example: Determinant of Channel Matrix

If the determinant of the matrices $H(s_k)$ is to be computed, the method can be trivially applied, as the determinant is a polynomial function in $s_k$. The determinant can also be computed from the adjoint, which can again be recursively computed from minors of $H(s_k)$, as outlined in Section 5-D.

F. Example: ZF for Nonsquare Channels and MMSE Receivers

For ZF receivers for nonsquare channels, the pseudoinverse needs to be computed, which can be expressed as (assuming $M_R \geq M_T$ and a full-rank $H(s_k)$) $f(H(s_k)) = (H^H(s_k)H(s_k))^{-1} H^H(s_k)$. The above framework for the square channel, with all its variations, can be applied by writing $$f_P^0(H(s_k)) = \det(H^H(s_k)H(s_k))$$

$$f_P^1(H(s_k)) = \text{adj}(H^H(s_k)H(s_k))H^H(s_k).$$

For MMSE receivers, the (regularized) MMSE inverse $$f(H(s_k)) = (\alpha I + H^H(s_k)H(s_k))^{-1}H^H(s_k) \text{ or } f(H(s_k)) = H^H(s_k)(\alpha I + H(s_k)H^H(s_k))^{-1}$$

needs to be computed. The above framework for the square channel, with all its variations, can be applied by writing $$f_P^0(H(s_k)) = \det(\alpha I + H^H(s_k)H(s_k))$$

$$f_P^1(H(s_k)) = \text{adj}(\alpha I + H^H(s_k)H(s_k))H^H(s_k).$$

or $$f_P^0(H(s_k)) = \det(\alpha I + H(s_k)H^H(s_k))$$

$$f_P^1(H(s_k)) = H^H(s_k)\text{adj}(\alpha I + H(s_k)H^H(s_k)).$$

In both cases of pseudoinverse and regularized inverse, we finally have $$f(H(s_k)) = f_{NP}(f_P^0(H(s_k)), f_P^1(H(s_k))) = \frac{1}{f_P^0(H(s_k))} f_P^1(H(s_k)).$$

Also, in both cases the degree of the pertinent polynomials is twice as high as in the square ZF case described above. Again, the adjoints and determinants can be computed by any sensible means, and their computation may again be expanded recursively. An example of such a recursive approach is what is known as the Riccati recursion. This algorithm has, among others, applications in adaptive filtering. The scaled version postpones divisions to the very end of the algorithm (effectively, the division by $f_P^0(H(s_k))$ is postponed). This allows the application of the described interpolation strategy, as intermediate results are polynomial and can be interpolated. As the degree of the polynomials grows through the recursion, stepwise interpolation becomes possible, allowing again for arbitrary tradeoffs between interpolation accuracy and the complexity of the algorithm. Divisions are only carried out in the very end.

G. Example: QR Decomposition for, e.g., V-BLAST and Sphere Decoding

V-BLAST and sphere decoding require the computation of, e.g., the QR-decomposition of the channel matrices. Our underlying principle is again applicable. For example, when computing the QR decomposition using Householder reflections, the Householder reflections can be interpolated. Another algorithm for the QR de-composition decompose the algorithm into multiplications followed by nonmultiplicative operations (see ref. [16]), where again the result of the multiplicative operations can be interpolated. In general, all these approaches can be summarized as follows: the entries of the matrices $Q(s_k)$ and $R(s_k)$ obtained in the QR decomposition are not polynomial in $s_k$, but rational functions of $s_k$. Hence, they can be transformed by a certain simple invertible mapping into polynomial matrices $f_P^0(H(s_k)) = \tilde{Q}(s_k)$ and $f_P^1(H(s_k)) = \tilde{R}(s_k)$, which are polynomial in $s_k$. The mapping is defined by the multiplication of the elements with a certain scalar polynomial that depends on the column of $Q(s_k)$ or the row of $R(s_k)$. In effect, the matrices $\tilde{Q}(s_k)$ and $\tilde{R}(s_k)$ can be interpolated. The matrices $\tilde{Q}(s_k)$ and $\tilde{R}(s_k)$ may be obtained by first computing $Q(s_k)$ and $R(s_k)$ by any means suitable for such a purpose (e.g., by Householder reflections, Givens rotations, or Gram-Schmidt orthogonalization), and consecutively applying the mapping; or, they may be computed directly from the entries of the $H(s_k)$.

More precisely, the method may in general be described as follows:

If the mth column of $Q(s_k)$ is denoted by $q_m(s_k)$ and the mth row of $R(s_k)$ is denoted by $r_m^T(s_k)$, then the QR decomposition $f(H(s_k)) = \{Q(s_k), R(s_k)\}$ can be computed using steps comprising     a. for $s_k$ with $k \in \Omega$, where the set $\Omega$ satisfies $|\Omega| \geq 2M_T L + 1$, performing a QR decomposition of $H(s_k) = Q(s_k)R(s_k)$ to obtain $Q(s_k)$ and $R(s_k)$, $k \in \Omega$     b. for each $s_k$ with $k \in \Omega$, applying a mapping to $Q(s_k)$ and $R(s_k)$ defined by $$\tilde{q}_m(s_k) = \Delta_{m-1}(s_k)[R(s_k)]_{m,m} q_m(s_k), m=1, 2, \ldots, M_T$$

$$\tilde{r}_m^T(s_k) = \Delta_{m-1}(s_k)[R(s_k)]_{m,m} r_m^T(s_k), m=1, 2, \ldots, M_T$$

where $\Delta_m(s_k)$ is defined by $$\Delta_m(s_k) = [R(s_k)]_{m,m}^2 \Delta_{m-1}(s_k), m=1, 2, \ldots, M_T-1$$

$$\Delta_0(s_k) = 1$$

and where $[R(s_k)]_{m,m}$ denotes the mth entry on the main diagonal of $R(s_k)$, to obtain the functions $$f_P^0(H(s_k)) = \tilde{Q}(s_k) = [\tilde{q}_0(s_k) \tilde{q}_1(s_k) \ldots \tilde{q}_{M_T}(s_k)]$$

$$f_P^1(H(s_k)) = \tilde{R}(s_k) = [\tilde{r}_0(s_k) \tilde{r}_1(s_k) \ldots \tilde{r}_{M_T}(s_k)]^T$$

c. determining $f_P^0(H(s_k))$ and/or $f_P^1(H(s_k))$ for at least one $s_k$ with $k \notin \Omega$ by interpolating said values of said functions $f_P^0(H(s_k))$ and/or $f_P^1(H(s_k))$ obtained in step b d. evaluating $\{Q(H)(s_k), R(s_k)\} = f_{NP}(f_P^0(H(s_k)), f_P^1(H(s_k)))$, which is defined by an inverse mapping on the said values of said functions $f_P^0(H(s_k))$ and/or $f_P^1(H(s_k))$ obtained in step c given by $$q_m(s_k) = (\Delta_{m-1}(s_k)[R(s_k)]_{m,m})^{-1} \tilde{q}_m(s_k), m=1, 2, \ldots, M_T$$

$$r_m^T(s_k) = (\Delta_{m-1}(s_k)[R(s_k)]_{m,m})^{-1} \tilde{r}_m^T(s_k), m=1, 2, \ldots, M_T$$

where $\Delta_{m-1}(s_k)[R(s_k)]_{m,m}$ can be obtained from $\tilde{R}(s_k)$ as $$\Delta_{m-1}(s_k)[R(s_k)]_{m,m} = \sqrt{[\tilde{R}(s_k)]_{m-1,m-1}[\tilde{R}(s_k)]_{m,m}},$$

$$m = 2, 3, \ldots, M_T$$

$$[R(s_k)]_{1,1} = \sqrt{[\tilde{R}(s_k)]_{1,1}}$$

to obtain at least one value of $Q(s_k)$ and/or $R(s_k)$ for $k \notin \Omega$

Again, recursive schemes can be applied, based on the observation that the $\tilde{q}_m(s_k)$ and $\tilde{r}_m^T(s_k)$ have increasing polynomial degree. An example of such a recursive approach comprises the following steps, with the set $\Gamma$ denoting the set of tone indices k for which the QR decomposition shall be evaluated, and the sets $\Omega_m$ chosen such that $|\Omega_m| \geq 2m(L-1)+1$ and $\Omega_m \subseteq \Gamma$, m=1, 2, ..., $M_T$:

a. setting m←1
b. if m=1, going to step d; else, for each $k \notin \Omega_m$ applying the inverse mapping (as described above in the nonrecursive method) to $\tilde{Q}_{1,m-1}(s_k)$, which denotes the submatrix consisting of the first m−1 columns $Q(s_k)$, and $\tilde{R}^{1,m-1}(s_k)$, which denotes the matrix consisting of the first m−1 rows of $\tilde{R}(s_k)$ to obtain $Q_{1,m-1}(s_k)$ and $R^{1,m-1}(s_k)$ which denote the submatrix consisting of the first m−1 columns of $Q(s_k)$ and the submatrix consisting of the first m−1 rows of $R(s_k)$, respectively
c. for each $k \in \Omega_m$, overwriting $H(s_k)$ by the assignment $$H(s_k) \leftarrow H(s_k) - Q_{1,m-1}(s_k) R^{1,m-1}(s_k)$$

d. for each $k \in \Omega_m$, performing a QR decomposition on the matrix obtained by picking the last $M_T$−m+1 columns of $F(s_k)$, to obtain $Q_{m,M_T}(s_k)$, which is the submatrix consisting of the last $M_T$−m+1 columns of $Q(s_k)$, and $R_{m,M_T}^{m,M_T}(s_k)$, which is the submatrix consisting of the last $M_T$−m+1 columns of the last $M_T$−m+1 rows of $R(s_k)$
e. for each $k \in \Omega_m$, applying the mapping (as described above in the non-recursive method) to $Q_{m,M_T}(s_k)$ and $R_{m,M_T}^{m,M_T}(s_k)$ to obtain $\tilde{Q}_{m,M_T}(s_k)$ and $\tilde{R}_{m,M_T}^{m,M_T}(s_k)$, which denote the submatrix consisting of the last $M_T$−m+1 columns of $\tilde{Q}(s_k)$ and the submatrix consisting of the last $M_T$−m+1 row of $\tilde{R}(s_k)$, respectively
f. determining $\tilde{q}_m(s_k) = f_P^{0,m}(H(s_k))$ and $\tilde{r}_m^T(s_k) = f_P^{1,m}(H(s_k))$ for all desired $s_k$ with $k \in \Gamma \backslash \Omega_m$ by interpolating said values of functions $\tilde{q}_m(s_k) = f_P^{0,m}(H(s_k))$ and $\tilde{r}_m^T(s_k) = f_P^{1,m}(H(s_k))$ obtained in step e
g. if m=$_T$, going to the next step; else, setting m←m+1 and going to step b
h. for each $k \in \Gamma \backslash \Omega_{M_T}$, apply the inverse mapping (as described above in the nonrecursive method) to $\tilde{Q}(s_k)$ and $\tilde{R}(s_k)$ to obtain $Q(s_k)$ and $R(s_k)$.

H. Other Applications

The same interpolation concept also applies, among others, to the square root algorithm that is used for low complexity V-BLAST implementation [17], the Cholesky factorization, the matrix square root, the eigenvalue decomposition, the Schur triangularization, the LU decomposition, the Hessenberg decomposition, the Jordan matrix decomposition, the LQ decomposition, singular value decomposition, and to numerous other applications in communications, signal processing, and adaptive filtering.

COMMENTS

It must be noted that the invention can be applied not only to wireless communication schemes but to all other MIMO-OFDM system, such as the transmission of signals through multiple wires with crosstalk. Also, the application is not confined to computations at the receiving end of a MIMO-OFDM system; instead, the method can also be applied to computations performed at the transmitter.

Furthermore, it can be noted that $H(s_k)$ in $f(H(s_k))$ can be replaced by a scalar-, vector-, or matrix-valued function $e(H(s_k))$ of $H(s_k)$, where said function $e(H(s_k))$ is polynomial in $s_k$. For example, instead of calculating the inverse $f(H(s_k)) = H(s_k)^{-1}$, the present methodology can also be used to calculate the inverse $e(H(s_k))^{-1}$ of a matrix $e(H(s_k))$ derived from $H(s_k)$.

REFERENCES

[1] L. J. Cimini, "Analysis and simulation of a digital mobile channel using orthogonal frequency division multiplexing," IEEE Trans. Commun., vol. 33, no. 7, pp. 665-675, July 1985.
[2] B. LeFloch, M. Alard, and C. Berrou, "Coded orthogonal frequency division multiplex," Proc. of IEEE, vol. 83, no. 6, pp. 982-996, June 1995.
[3] Supplement to IEEE standard for information technology—Part 11: wireless LAN medium access control (MAC) and physical layer (PHY) specifications—high-speed physical layer in the 5 GHz band, IEEE Std. 802.11a, Rev. 1999, 1999.
[4] IEEE standard for local and metropolitan area networks—Part 16: Air interface for fixed broadband wireless access systems, IEEE Std. 802.16-2004, Rev. 2004, 2004.
[5] H. Bölcskei, D. Gesbert, and A. J. Paulraj, "On the capacity of OFDM-based spatial multiplexing systems," IEEE Trans. Commum., vol. 50, no. 2, pp. 225-234, February 2002.
[6] V. Tarokh, N. Seshadri, and A. R. Calderbank, "Space-time codes for high data rate wireless communication: Performance criterion and code construction," IEEE Trans. Inform. Theory, vol. 44, no. 2, pp. 744-765, March 1998.
[7] H. Bölcskei and A. J. Paulraj, "Space-frequency coded broadband OFDM systems," in Proc. IEEE WCNC-2000, Chicago, Ill., September 2000, pp. 1-6.
[8] A. J. Paulraj and T. Kailath, "Increasing capacity in wireless broadcast systems using distributed transmission/directional reception," U.S. Pat. No. 5,345,599, 1994.
[9] G. J. Foschini, "Layered space-time architecture for wireless communication in a fading environment when using multi-element antennas," Bell Labs Tech. J., pp. 41-59, Autumn 1996.
[10] G. J. Foschini, G. D. Golden, R. A. Valenzuela, and P. W. Wolniansky, "Simplified processing for high spectral efficiency wireless communication employing multi-antenna arrays," IEEE J. Select. Areas Commun., vol. 17, no. 11, pp. 1841-1852, November 1999.

[11] A. J. Paulraj, R. U. Nabar, and D. A. Gore, Introduction to Space-Time Wireless Communications. Cambridge, UK: Cambridge Univ. Press, 2003.
[12] S. Barnett, "Algebraic manipulation of polynomial matrices: A survey," IMA J. Math. Contr. Inform., vol. 7, no. 3, pp. 249-256, 1990.
[13] A. Schuster and P. Hippe, "Inversion of polynomial matrices by interpolation," IEEE Trans. Automat. Contr., vol. 37, no. 3, pp. 363-365, March 1992.
[14] L. Paccagnella and G. Pierobon, "FFT calculation of a determinantal polynomial," IEEE Trans. Automat. Contr., vol. 21, no. 3, pp. 401-402, June 1976.
[15] R. E. Crochiere and L. R. Rabiner, Multirate Digital Signal Processing. Englewood Cliffs (NJ): Prentice Hall, 1983.
[16] L. M. Davis, "Scaled and decoupled Cholesky and QR decompositions with application to spherical MIMO detection," in Proc. IEEE WCNC 2003, New Orleans, La., March 2003, pp. 326-331.
[17] B. Hassibi, "A fast square-root implementation for BLAST," in Proc. 34th Asilomar Conf. Signals, Systems, Computers, Pacific Grove, Calif., November 2000, pp. 1255-1259.

While there are shown and described presently preferred embodiments of the invention, it is to be distinctly understood that the invention is not limited thereto but may be otherwise variously embodied and practiced within the scope of the following claims.

The invention claimed is:

1. A method for transmitting data through a MIMO-OFDM system having a transmitter and a receiver that communicate through a channel, wherein the transmitter comprises $M_T$ transmitter units $TU_0 \ldots TU_{M_T-1}$ and the receiver comprises $M_R$ receiver units $RU_0 \ldots RU_{M_R-1}$, said method comprising the steps of
   a) feeding a sequence of original symbols to said transmitter, each original symbol comprising $N>1$ vectors $c_k$ with $k=0 \ldots N-1$, wherein each vector $c_k$ has $M_T$ complex-valued coordinates $(c_0)_k \ldots (c_{M_T-1})_k$ to be fed to the transmitter units $TU_0 \ldots TU_{M_T-1}$,
   b) OFDM-modulating said original symbols in said transmitter units and transmitting them to said receiver units,
   c) receiving, by said receiver units, said transmitted symbols distorted by the channel and decoding them into received symbols, wherein each received symbol comprises N vectors $r_k$ with $k=0 \ldots N-1$, wherein each vector $r_k$ has $M_R$ complex-valued coordinates $(r_0)_k \ldots (r_{M_R-1})_k$, wherein, at least in approximation, $$r_k = \sqrt{E_s} H(s_k) c_k + w_k,$$

with
$\sqrt{E_s}$ being a constant,
$s_k = \exp(-j2\pi k/N)$, j being the imaginary unit, $$H(s_k) = \sum_{l=0}^{L-1} H_l s_k^l,$$

L an integer smaller than N,
$H_l$ being an $M_R \times M_T$ matrix having coefficients $(H_{ij})_l$ describing the value at discrete-time delay l of the discrete-time impulse response of the channel between transmitter unit $TU_j$ and receiver unit $RU_i$, and
$w_k$ being a noise vector,
   d) said method further comprising the step of carrying out at least one computation of a function $f(H(s_k))$ for $k=0 \ldots N-1$ on said matrices $H(s_k)$, which function f can be expressed as
   $f(H(s_k)) = f_{NP}(f_P^0(H(s_k)), \ldots f_P^{J-1}(H(s_k)))$ with $J \geq 1$ and scalar-, vector- or matrix-valued polynomial functions $f_P^0(H(s_k)), \ldots f_P^{J-1}(H(s_k))$ that can be expressed as $$f_P^i(H(s_k)) = \sum_{l=0}^{N-1} A_l^i s_k^l$$

with coefficients $A_l^i$
wherein a number $Q_i$ of said coefficients $A_l^i$ are arbitrary functions $$A_l^i = g_l^i(H_0, \ldots H_{L-1}) \text{ of the matrices } H_0, \ldots, H_{L-1}$$

and a number $N-Q_i$ said coefficients $A_l^i$ are zero, with $1 \leq Q_i < N$
   e) said method further comprising the step of carrying out at least one computation of a said function $f_P^i(H(s_k))$ using the steps comprising
   step A) determining from known $H(s_k)$, for at least some of said polynomial functions $f_P^i(H(s_k))$, a number of $V_i \geq Q_i$ values of said function $f_P^i(s_k)$ at a set of $s_k$ with $k \in \Omega_i$ and $|\Omega_i| = V_i \geq Q_i$, and
   step B) determining, for at least some of said polynomial functions $f_P^i(H(s_k))$, at least one value $f_P^i(H(s_k))$ for an $s_k$ with $k \notin \Omega_i$ by interpolation of the values of said function $f_P^i(H(s_k))$ obtained in step A).

2. The method of claim 1 with polynomial functions $f_P^v(H(s_k))$ with vectors of indices v wherein $f_P^i(H(s_k)) = f_P^v(H(s_k))$ with the index vector $v=[i]$, where at least one of the functions $f_P^v(H(s_k))$ with $v=[i]$ can be computed using steps comprising
   a) expressing $f_P^v(H(s_k))$ as $f_P^v(H(s_k)) = \tilde{f}_P^v(f_P^{[v,0]}(H(s_k)), \ldots, f_P^{[v,J_v-1]}(H(s_k)))$, where the short notation [v,p] is used for the vector obtained by appending p to the end of v and where $\tilde{f}_P^v(f_P^{[v,0]}(H(s_k)), \ldots, f_P^{[v,J_v-1]}(H(s_k)))$ is a polynomial function in $s_k$, with $J_v \geq 1$ and scalar-, vector-, or matrix-valued polynomial functions $f_P^{[v,0]}(H(s_k)), \ldots, f_P^{[v,J_v-1]}(H(s_k))$ that can be expressed as $$f_P^{[v,p]}(H(s_k)) = \sum_{l=0}^{N-1} A_l^{[v,p]} s_k^l$$

with coefficients $A_l^{[v,p]}$
wherein a number $Q_{[v,p]}$ of said coefficients $A_l^{[v,p]}$ are arbitrary functions $$A_l^{[v,p]} = g_l^{[v,p]}(H_0, \ldots, H_{L-1}) \text{ of the matrices } H_0, \ldots, H_{L-1}$$

and a number $N-Q_{[v,p]}$ of said coefficients $A_l^{[v,p]}$ are zero, with $1 \leq Q_{[v,p]} < N$ b) carrying out at least one computation of a said function $f_P^{[v,p]}(H(s_k))$ using either i) the steps comprising step A') determining from known $H(s_k)$, for at least some of said polynomial functions $f_P^{[v,p]}(H(s_k))$, a number of $V_{[v,p]} \geq Q_{[v,p]}$ values of said function $f_P^{[v,p]}(H(s_k))$ at a set of $s_k$ with $k \in \Omega_{[v,p]}$ and $|\Omega_{[v,p]}|=V_{[v,p]} \geq Q_{[v,p]}$, and step B') determining, for at least some of said polynomial functions $f_P^{[v,p]}(H(s_k))$, at least one value $f_P^{[v,p]}(H(s_k))$ for an $s_k$ with $k \notin \Omega_{[v,p]}$ by interpolation of the values of said function $f_P^{[v,p]}(H(s_k))$ obtained in step A'), or ii) recursively applying the method described in steps a) and b) again after assigning said function $f_P^{[v,p]}(H(s_k))$ as $f_P^{v}(H(s_k)) \leftarrow f_P^{[v,p]}(H(s_k))$.

3. The method of claim 2 wherein the computation of said function $f(H(s_k))$ is recursively expanded and where at least two functions $f_P^{v}(H(s_k))$ and $f_P^{v'}(H(s_k))$ for index vectors $v \neq v'$ are identical and are computed only once such that the results are shared among the computation of the enclosing functions $f_P^{u}(\ldots)$ and $f_P^{u'}(\ldots)$, where $u$ and $u'$ denote the vectors obtained by deleting the last element from the vectors $v$ and $v'$, respectively.

4. The method of claim 1 wherein $M_R=M_T$ and wherein said function $f$ is $$f(H(s_k))=H^{-1}(s_k).$$

5. The method of claim 4 wherein $$f_{NP}(f_P^0(H(s_k)), f_P^1(H(s_k))) = \frac{1}{f_P^0(H(s_k))} f_P^1(H(s_k)),$$

and $$f_P^0(H(s_k))=det(H(s_k))$$

is a scalar-valued polynomial in $s_k$ with coefficients $A_l^0$ depending on the matrices $H_0, \ldots H_{L-1}$, and, $$f_P^1(H(s_k))=adj(H(s_k))$$

is a matrix-valued polynomial in $s_k$ with coefficients $A_l^1$ depending on the matrices $H_0, \ldots, H_{L-1}$.

6. The method of claim 1 where said function $f$ is computed using the steps comprising a) computing $f_P^1(H(s_k))=adj(H(s_k))$ for $k \in \Omega_1$, b) determining at $f_P^1(H(s_k))=adj(H(s_k))$ for at least all $s_k$ with $k \in \check{z}_0 \backslash \check{z}_1$ by interpolation of the values of said function $f_P^1(H(s_k))$ obtained in step A)

c) computing $f_P^0(H(s_k))=det(H(s_k))$ for $k \in \Omega_0$ from one row or column of $H(s_k)$) and the corresponding row or column of $f_P^1(H(s_k))=adj(H(s_k))$ using the Laplace expansion method.

7. The method of claim 1 where $M_R=M_T=M$, where $minor_m(H(s_k))$ denotes an m-minor of the matrix $H(s_k)$, with the entries of the adjoint of $H(s_k)$ being the set of all possible (M−1)-minors of $H(s_k)$ up to sign flips, and the M-minor being the determinant of, wherein $minor_m(H(s_k))$ is a scalar-valued polynomial in $s_k$ with $Q_m$ nonzero coefficients $A_l^0$ depending on the matrices $H_0, \ldots H_{L-1}$, and where R is a natural number with $1<R<M$, and wherein $f_P^1(H(s_k))=adj(H(s_k))$ is computed using at least one application of the steps comprising a) computing a certain set of R-minors $\{minor_N(H(s_k))\}$ for $k \in \Omega_R$, where $|\Omega_R| \geq Q_R$, by any suitable method b) determining the values of said R-minors for at least one $k \notin \Omega_R$ by interpolation of the values of said R-minors obtained in step a)

c) computing the values of a set of (R+1)-minors for $k \in \Omega_{R+1}$ using Laplace expansion from the set of R-minors obtained in step b) and suitable elements of the matrices $H(s_k)$.

8. The method of claim 1 wherein said function f is the pseudoinverse of $H(s_k)$), or alternatively a) if $M_R \geq M_T$:

$$f(H(s_k))=(H^H(s_k)H(s_k))^{-1} \text{ or } f(H(s_k))=(H^H(s_k)H(s_k))^{-1}H^H(s_k)$$

b) if $M_R \leq M_T$:

$$f(H(s_k))=(H(s_k)H^H(s_k))^{-1} \text{ or } f(H(s_k))=H^H(s_k)(H(s_k)H^H(s_k))^{-1}.$$

9. The method of claim 1 wherein $\alpha$ is a real number and said function f is a regularized (pseudo)inverse of $H(s_k)$, or alternatively $$f(H(s_k))=(\alpha I+H^H(s_k)H(s_k))^{-1} \text{ or } f(H(s_k))=(\alpha I+H^H(s_k)H(s_k))^{-1}H^H(s_k) \text{ or}$$

$$f(H(s_k))=(\alpha I+H(s_k)H^H(s_k))^{-1} \text{ or } f(H(s_k))=H^H(s_k)(\alpha I+H(s_k)H^H(s_k))^{-1}.$$

10. The method of claim 1 wherein said function f computes the determinant or minor of any square matrix-valued function $f_P(H(s_k))$, where $f_P(H(s_k))$ is a scalar-valued polynomial in $s_k$ with coefficients $A_l^0$ depending on the matrices $H_0, \ldots H_{L-1}$.

11. The method of claim 1 wherein said function $f$ represents the QR decomposition of $H(s_k)$, i.e., $$f(H(s_k))=\{Q(s_k),R(s_k)\}$$

with $\{Q(s_k), R(s_k)\}$ denoting a set of matrices $Q(s_k)$ and $R(s_k)$ with $H(s_k)=Q(s_k)R(s_k)$ and the $M_R \times M_T$ matrix $Q(s_k)$ having orthonormal columns and the $M_T \times M_T$ matrix $R(s_k)$ being triangular.

12. The method of claim 11 wherein the mth column of $Q(s_k)$ is denoted by $q_m(s_k)$ and where the mth row of $R(s_k)$ is denoted by $r_m^T(s_k)$ and wherein said function $f(H(s_k))=\{Q(s_k),R(s_k)\}$ is computed using steps comprising (a) for $s_k$ with $k \in \Omega$, with a certain set $\Omega$, performing a QR decomposition of $H(s_k)=Q(s_k)R(s_k)$ to obtain $Q(s_k)$ and $R(s_k)$, $k \in \Omega$ (b) for each $s_k$ with $k \in \Omega$, applying a mapping to $Q(s_k)$ and $R(s_k)$ defined by $$\tilde{q}_m(s_k)=\Delta_{m-1}(s_k)[R(s_k)]_{m,m}q_m(s_k), m=1,2,\ldots,M_T$$

$$\tilde{r}_m^T(s_k)=\Delta_{m-1}(s_k)[R(s_k)]_{m,m}r_m^T(s_k), m=1,2,\ldots,M_T$$

where $\Delta_m(s_k)$ is defined by $$\Delta_m(s_k)=[R(s_k)]_{mm}^2 \Delta_{m-1}(s_k), m=1,2,\ldots,M_T-1$$

$$\Delta_0(s_k)=1$$

and where $[R(s_k)]_{m,m}$ denotes the mth entry on the main diagonal of $R(s_k)$, to obtain the functions $$f_P^0(H(s_k))=\tilde{Q}(s_k)=[\tilde{q}_0(s_k)\tilde{q}_1(s_k)\ldots\tilde{q}_{M_T}(s_k)]$$

$$f_P^1(H(s_k))=\tilde{R}(s_k)=[\tilde{r}_0(s_k)\tilde{r}_1(s_k)\ldots\tilde{r}_{M_T}(s_k)]^T$$

(c) determining $f_P^0(H(s_k))$ and/or $f_P^1(H(s_k))$ for at least one $s_k$ with $k \notin \Omega$ by interpolating said values of said functions $f_P^0(H(s_k))$ and/or $f_P^1(H(s_k))$ obtained in step b (d) evaluating $\{Q(s_k), R(s_k)\} = f_{NP}(f_P^0(H(s_k)), f_P^1(H(s_k)))$, which is de-fined by an inverse mapping on the said values of said functions $f_P^0(H(s_k))$ and/or $f_P^1(H(s_k))$ obtained in step c given by $$q_m(s_k) = \Delta_{m-1}(s_k)[R(s_k)]_{m,m})^{-1} \tilde{q}_m(s_k), m=1,2,\ldots,M_T$$

$$r_m^T(s_k) = \Delta_{m-1}(s_k)[R(s_k)]_{m,m})^{-1} \tilde{r}_m^T(s_k), m=1,2,\ldots,M_T$$

where $\Delta_{m-1}(s_k)[R(s_k)]_{m,m}$ can be obtained from $\tilde{R}(s_k)$ as $$\Delta_{m-1}(s_k)[R(s_k)]_{m,m} = \sqrt{[\tilde{R}(s_k)]_{m-1,m-1}[\tilde{R}(s_k)]_{m,m}},$$

$$m = 2, 3, \ldots, M_T$$

$$[R(s_k)]_{1,1} = \sqrt{[\tilde{R}(s_k)]_{1,1}}$$

to obtain at least one value of $Q(s_k)$ and/or $R(s_k)$ for $k \notin \Omega$.

13. The method of claim 12 wherein said functions $f_P^0(H(s_k))$ and/or $f_P^1(H(s_k))$ are computed using steps comprising, for some $1 \leq m \leq M_T$, and some set $\Omega_m$, (a) computing $$F(s_k) = H(s_k) - Q_{1,m-1}(s_k) R^{1,m-1}(s_k)$$

where $Q_{1,m-1}(s_k)$ denotes the submatrix consisting of the first m−1 columns of $Q(s_k)$, and $R^{1,m-1}(s_k)$ denotes the matrix consisting of the first m−1 rows of $R(s_k)$ (b) for $s_k$ with $k \in \Omega_m$, performing a QR decomposition on the matrix obtained by picking the last $M_T-m+1$ columns of $F(s_k)$, to obtain $Q_{m,M_T}(s_k)$, which is the submatrix consisting of the last $M_T-m+1$ columns of $Q(s_k)$, and $R_{m,M_T}^{m,M_T}(s_k)$, which is the submatrix consisting of the last $M_T-m+1$ columns of the last $M_T-m+1$ rows of $R(s_k)$ (c) for each $s_k$ with $k \in \Omega_m$, applying a mapping to the first column $q_m(s_k)$ of $Q_{m,M_T}(s_k)$ and the first row $r_m^T(s_k)$ of $R_{m,M_T}^{m,M_T}(s_k)$ defined by $$\tilde{q}_m(s_k) = \Delta_{m-1}(s_k)[R(s_k)]_{m,m} q_m(s_k)$$

$$\tilde{r}_m^T(s_k) = \Delta_{m-1}(s_k)[R(s_k)]_{m,m} r_m^T(s_k)$$

where $\Delta_m(s_k)$ is defined by $$\Delta_m(s_k) = [R(s_k)]_{m,m}^2 \Delta_{m-1}(s_k)$$

$$\Delta_0(s_k) = 1$$

and where $[R(s_k)]_{m,m}$ denotes the mth entry on the main diagonal of $R(s_k)$, to obtain the functions $$f_P^{0,m}(H(s_k)) = \tilde{q}_m(s_k)$$

$$f_P^{1,m}(H(s_k)) = \tilde{r}_m^T(s_k)$$

(d) determining $\tilde{q}_m(s_k) = f_P^{0,m}(H(s_k))$ and $\tilde{r}_m^T(s_k) = f_P^{1,m}(H(s_k))$ for at least one $s_k$ with $k \notin \Omega_m$ by interpolating said values of said functions $f_P^{0,m}(H(s_k))$ and/or $f_P^{1,m}(H(s_k))$ obtained in step c.

14. The method of claim 1 wherein $M_R = M_T$ and wherein said function f represents the application of, or requires as an intermediate operation the application of, the Cholesky factorization, a matrix square root, an eigenvalue decomposition, the Schur triangularization, an LU decomposition, the Hessenberg decomposition, the Jordan matrix decomposition, an LQ decomposition, or any intermediate results useful in the computation of such operations.

15. The method of claim 1 wherein said function f represents the application of, or requires as an intermediate operation the application of, a singular value decomposition, or any intermediate results useful in the computation of such operations.

16. The method of claim 1 wherein $H(s_k)$ in $f(H(s_k))$ is replaced by a scalar-, vector-, or matrix-valued function $e(H(s_k))$ of $H(s_k)$, where said function $e(H(s_k))$ is polynomial in $s_k$.

* * * * *